United States Patent [19]

Brumme et al.

[11] Patent Number: 4,927,122
[45] Date of Patent: May 22, 1990

[54] VIBRATION ABSORBER

[75] Inventors: Reinhold Brumme, Wiesbaden, Fed. Rep. of Germany; Roger Desons, Les Essarts Le Roi, France

[73] Assignee: Applied Power Inc., Milwaukee, Wis.

[21] Appl. No.: 277,726

[22] Filed: Nov. 30, 1988

[30] Foreign Application Priority Data

Jan. 8, 1988 [FR] France ............................. 88 00158

[51] Int. Cl.$^5$ ............................................. F16F 13/00
[52] U.S. Cl. .................................. 267/140.1; 180/312; 248/562; 248/636
[58] Field of Search .......................... 267/140.1, 219; 248/562, 636; 180/300, 312, 902

[56] References Cited

U.S. PATENT DOCUMENTS

| 3,698,703 | 10/1972 | Hipsher | 267/63 |
| 3,874,646 | 4/1975 | Vernier | 267/140.1 |
| 4,086,984 | 5/1978 | Johansson | 188/1 B |
| 4,458,888 | 7/1984 | Wolf et al. | 267/140.1 |
| 4,468,016 | 8/1984 | Pineau | 267/141 |
| 4,610,438 | 9/1986 | Eberhard et al. | 267/140.1 X |
| 4,641,817 | 2/1987 | Clark et al. | 207/140.1 |
| 4,741,519 | 5/1988 | Dubos et al. | 267/140.1 |
| 4,789,144 | 12/1988 | Brenner | 267/140.1 |

FOREIGN PATENT DOCUMENTS

| 255434 | 2/1988 | European Pat. Off. | 267/219 |
| 2129910 | 5/1984 | United Kingdom | 267/140.1 |

Primary Examiner—George E. A. Halvosa

[57] ABSTRACT

A vibration damper comprising a housing containing two bell-shaped membranes of resiliently deformable material facing one another, and defining a single liquid filled chamber. The damper is interposed between two devices to be isolated, one of such devices being affixed to the housing and the other being affixed to a rod, which passes between both membranes, with a circular washer shaped element located between the tops of the bells of the membranes. Upon movement of the rod and deformation of the membranes the liquid is subjected to friction due to shearing of the fluid against the housing due to the movement of the washer through the liquid in a non-throttling arrangement.

7 Claims, 2 Drawing Sheets

VIBRATION ABSORBER

BACKGROUND OF THE INVENTION

The present invention concerns a vibration absorber intended to be disposed between two devices to be isolated from shock and vibration with respect to one another, of the type comprising a housing enclosing two bell-shaped membranes of a resiliently deformable material. The membranes are mounted in coaxial relationship and axially aligned inside the housing, with the tops thereof facing each other. The housing is affixed to one of the devices, and a rod is affixed to the other of said devices and is also affixed to at least one of the said membranes so that a relative motion of the rod with respect to the housing causes a resilient deformation of at least one membrane.

U.S. Pat. No. 4,468,016 issued on Aug. 28, 1984 to Andre L. Pineau, discloses a shock and vibration absorber of this type of construction, in which the membrane mounting the rod is freely slidable at its periphery within the housing. Other vibration dampers employing flexible membranes are shown in U.S. Pat. No. 4,741,519 issued on May 3, 1988 to Daniel Dubos, et. al, and in U.S. Pat. No. 4,458,888 issued on July 10, 1984 to Franz J. Wolf, et. al., both of which show a vibration absorbing damper which provides a plurality of fluid filled chambers which communicate with one another through throttling channels. These prior art absorbers provide an excellent damping at the upper frequencies. However, they present the major drawback that the amplitude of the vibrations at the resonance frequency is relatively high.

SUMMARY OF THE INVENTION

The present invention has as an object to propose an absorber which overcomes the drawback of the prior art of exhibiting high amplitude vibrations at the upper frequencies while presenting excellent properties at the higher frequencies.

To accomplish this object, the absorber according to the invention is characterized in that both membranes are affixed to a rod at their tops and that their radially outer peripheral surfaces delimit a tight chamber inside the housing of a constant volume, and which is filled with a liquid.

According to an advantageous feature of the invention, the rod carries between both tops of the membranes a circular washer-shaped element which projects radially towards the interior of the chamber filled with a liquid, but not so far as to produce any throttling action.

According to another advantageous feature of the invention, the liquid employed is silicone fluid.

According to still another advantageous feature of the invention, a sleeve means is coaxially mounted inside of and contacting the housing, and the membranes are tightly connected to this sleeve at their bases to form a tight chamber between the membranes and the opposite peripheral face of said sleeve means.

DETAILED DESCRIPTION OF THE INVENTION

The invention will be better understood and further objects, features, details and advantages thereof will appear more clearly from the following explanatory description having reference to the drawings illustrating the preferred embodiment of the invention, wherein.

Figure 1:
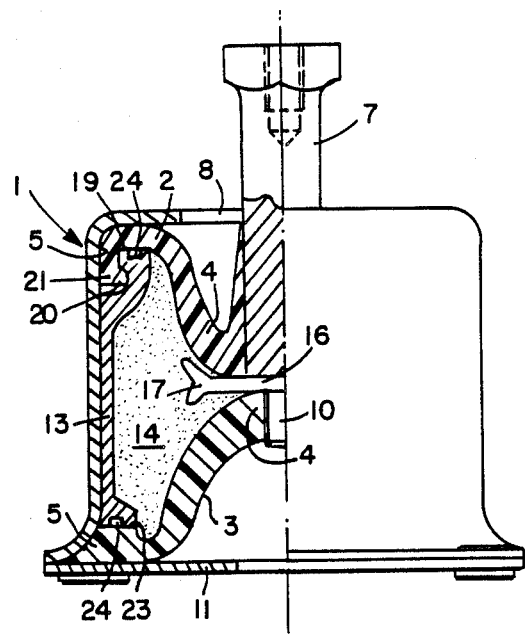
FIG. 1 is a side view with axial half cross-section of an absorber according to the present invention.
Figure 2:
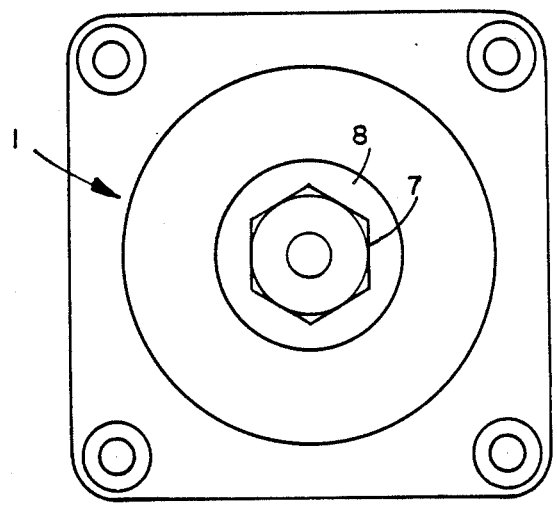
FIG. 2 is a top view of the absorber of FIG. 1.

Referring to FIGS. 1 and 2, it is seen that an absorber according to the invention comprises a closed cylindrical casing 1, made advantageously of an appropriate metallic material. Two bell-shaped membranes 2 and 3, each of a resiliently deformable material, are coaxially mounted and axially aligned inside the casing 1. The membranes are arranged to have their tops 4 facing each other, and are clamped to the casing 1 through their bases 5. Rod 7 coaxially passes through both membranes 2 and 3 which are affixed to the rod. The upper front face of the casing 1 presents a central circular opening 8 through which the rod 7 extends outwardly. At its inner end, the rod 7 is fixed to the membrane 3 by any appropriate means, e.g. by means of a threaded part with a lower diameter 10 co-operating with a corresponding axial threaded hole within this membrane, or simply by means of a nut. The membrane 2 is fixed to the peripheral surface of the rod 7 by any known appropriate means. At its end opposite to the opening 8, the casing 1 is closed by a separate bottom plate 11. The vibration absorber is positioned between two devices respectively fixed to the casing 1 and to the rod 7.

A sleeve 13 is coaxially mounted inside the casing 1 and the bases 5 of the membranes are fixedly held on their periphery, through clamping, between the ends of the sleeve 13 and the casing 1. As seen in FIG. 1, the radially outer peripheral surfaces of membranes 2 and 3 and the radially inner surface of sleeve 13 delimit a tight circular chamber 14 filled with an appropriate liquid such as silicone fluid. As the membranes 2 and 3 are affixed to the rod 7, the volume of chamber 14 is constant, irrespective of any relative motion between rod 7 and casing 1. Between the two tops 4 of the membranes, a circular washer-shaped means 16 is mounted in a fixed manner on rod 7 and projects radially towards the interior of chamber 14. The peripheral part of washer 16 is advantageously shaped so as to present a V-shaped profile which opens radially towards the interior of the chamber. The V-shaped part 17 is preferably made of a flexible material. Washer 16 is spaced from the inner surface of sleeve 13 so as to avoid any throttling effect.

As shown in FIG. 1, the upper membrane 2 is adapted in particular to be elongation stressed. To this end, the base 5 of membrane 2 is immobilized to avoid any wrenching. The upper end of sleeve 13 is radially shifted inwards so as to form an anchoring groove 20 in the radially outer face, near the front face 19. The base of membrane 2 includes an enlargement 21 through which it enters the groove 20 while being pressed against the front face 19 and clamped between the latter and the inner face of casing 1. The base 5 of the lower membrane 3 is compression stressed, and is clamped between the lower end of sleeve 13 and the bottom plate 11. To improve the tightness of chamber 14 at the bases 5 of the membranes, labyrinth seals shown at 24 are provided in the front faces 19 and 23 of the sleeve.

The membranes 2 and 3 can be made of any appropriate resiliently deformable material. Elastomer membranes. e.g. silicone membranes, are advantageously used. The liquid for filling the chamber 14, is a fluid whose sensitivity to temperature is low and which is chemically neutral with respect to the membrane-forming material. Silicone fluid exhibits very satisfactory properties. Advantageously, its viscosity lies between 60 and 250 Stokes.

Figure 3:
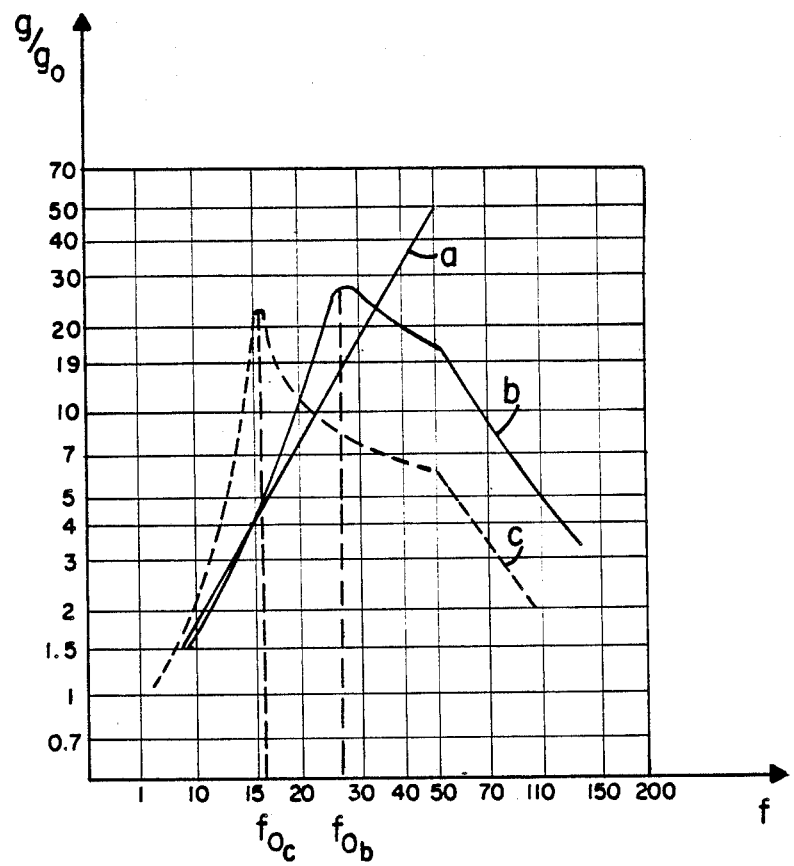
FIG. 3 shows in the shape of curves the behavior respectively of the absorber according to the invention and of a prior art absorber under the effect of predetermined excitation vibrations, the frequency of which varies.

FIG. 3 shows the advantage of an absorber according to the invention when compared to an absorber substantially having the same structure but having no tight chamber filled with a liquid. FIG. 3, wherein the abscissa and the ordinate indicate respectively the frequency f and the ratio between the acceleration g and the acceleration due to gravity go, illustrates the response of the absorbers to an excitation signal the evolution of which with respect to the frequency is shown by curve a. Up to the frequency of 50 Hz, the signal amplitude is constant and has a value of e.g. 0.5 mm. From this frequency of 50 Hz, it is the acceleration g which is maintained constant. The curve b shows the response of the absorber according to the invention whereas the curve C, in dotted line, shows the response of a prior art absorber. It is seen that at the resonance frequency Fob of the absorber according to the invention the overtension coefficient nearly equals 2, this coefficient being formed of the ratio of the values of curves b and a at this resonance frequency Fob. For comparison, a prior art absorber of which the resonant frequency is indicated at Foc presents an overtension coefficient of about 5. This means that the absorber according to the invention has an overtension coefficient which is 2.5 times lower than that of the prior art absorber having no chamber filled with a liquid. This advantageous result produced by the absorber according to the invention can be explained by the effect of friction through shearing of the liquid at the walls of the chamber. This is particularly brought about by the provision of the washer element 16, and it's special shape 17, which increases the shearing action. Besides, it is seen in FIG. 3 that the presence of the liquid in the chamber 14 of the absorber according to the invention is not detrimental to the damping quality at the higher frequencies with respect to a prior art absorber. In both cases, the damping in the high frequency range is of 12 db/octave.

We claim:

1. A vibration absorptive assembly for dampening shock and vibration between first and second structural elements said assembly comprising:
   a casing including: a generally cylindrical side wall, a bottom plate wall adapted to be attached to a first structural member, and a top wall, said top, said and bottom walls defining a casing chamber therein;
   an aperture disposed in the top wall in axial alignment with the axis of the cylindrical side wall;
   a rod member having an inner end disposed within the casing chamber and an outer end extending exteriorly of the chamber, the outer end adapted to be attached to a second structural element;
   a first resiliently deformable bell-shaped membrane disposed in the casing chamber and having, inner and outer surfaces, a top bell-shaped portion axially attached to a portion of the inner end of said rod member, and an integral lower radially extending peripheral edge portion bearing against adjacent portions of the side and bottom walls;
   a second resiliently deformable bell-shaped membrane disposed in the casing chamber in a position diametrically opposed to said first membrane and having inner and outer surfaces, a top bell-shaped portion axially attached to a portion of the inner end of said rod member adjacent to the outer surface of the top bell-shaped portion of said first membrane and an integral lower radially extending peripheral edge portion bearing against adjacent portions of the side and top walls;
   the outer surfaces of the first and second bell-shaped membranes delimiting a hydraulic chamber;
   a fluid filling said hydraulic chamber;
   a sleeve member coaxially mounted within the hydraulic chamber adjacent the cylindrical side wall, said sleeve member terminating at one end with a first front face engaging the peripheral edge portion of the first membrane and a second front face engaging the peripheral edge portion of the second membrane whereby the peripheral edge portions are firmly sealed between the cylinder faces and the casing walls;
   a circular washer-shaped element disposed upon the rod member between the top bell-shaped portions of the first and second membranes;
   said washer-shaped member extending radially into the hydraulic chamber and terminating in a V-shaped profile;
   whereby dampening between said first and second structural elements is effected by relative motion of the rod and washer-shaped element with respect to the resilient membranes and the hydraulic fluid in said hydraulic chamber.

2. A vibration absorber according to claim 1 wherein the fluid is silicone fluid.

3. A vibration absorber according to claim 1 in which the sleeve member is coaxially mounted within the casing chamber, one end of said sleeve being formed with a shoulder radially projecting towards the common axis of said casing chamber and said sleeve, and forming a circular anchoring groove in the radial outer face of the sleeve, one of said membranes being retained at its peripheral edge portion in said groove while being pressed against a first front face of the sleeve, said membrane peripheral edge portion being clamped between said first front face of the sleeve and the casing.

4. A vibration absorber according to claim 3, in which the other membrane is secured to the casing at its peripheral edge portion by being clamped between a second front face of said sleeve and the bottom plate wall of the casing.

5. A vibration absorber according to claim 4, in which the first and second front faces of said sleeve are formed with sealing elements.

6. A vibration absorber according to claim 1, in which the washer's V-shaped profile radially opens towards the interior of the hydraulic fluid chamber and is substantially relatively spaced from the casing.

7. A vibration absorber according to claim 6, in which at least the radially outer surface of the washer is of a resilient material.

* * * * *